US008157393B2

(12) United States Patent
Wilson

(10) Patent No.: US 8,157,393 B2
(45) Date of Patent: Apr. 17, 2012

(54) SIDE MIRROR ASSEMBLY WITH INTEGRATED SPOTTING MIRROR

(75) Inventor: Douglas J. Wilson, Fort Gratiot, MI (US)

(73) Assignee: SMR Patents S.a.r.l., Luxembourg (LU)

( * ) Notice: Subject to any disclaimer, the term of this patent is extended or adjusted under 35 U.S.C. 154(b) by 360 days.

(21) Appl. No.: 12/430,524

(22) Filed: Apr. 27, 2009

(65) Prior Publication Data

US 2009/0213481 A1 Aug. 27, 2009

Related U.S. Application Data

(63) Continuation-in-part of application No. 11/855,588, filed on Sep. 14, 2007, now abandoned.

(51) Int. Cl.
*G02B 5/10* (2006.01)
(52) U.S. Cl. ........................................ 359/868
(58) Field of Classification Search .................. 359/866, 359/868, 871, 864
See application file for complete search history.

(56) References Cited

U.S. PATENT DOCUMENTS

| | | | |
|---|---|---|---|
| 2,911,177 A | 11/1959 | West | |
| 3,267,806 A | 8/1966 | Azegami | |
| 4,325,609 A | 4/1982 | Alford | |
| 5,005,962 A | 4/1991 | Edelman | |
| 5,022,747 A | 6/1991 | Polyani et al. | |
| 5,530,588 A | 6/1996 | Vivier | |
| 5,805,367 A * | 9/1998 | Kanazawa | 359/868 |
| 6,032,323 A | 3/2000 | Smith et al. | |
| 6,199,993 B1 | 3/2001 | Mou | |
| 6,315,419 B1 | 11/2001 | Platzer, Jr. | |
| 6,343,402 B1 | 2/2002 | Smith et al. | |
| 6,398,377 B1 | 6/2002 | Chou | |
| 6,511,192 B1 | 1/2003 | Henion et al. | |
| 6,522,451 B1 | 2/2003 | Lynam | |
| 6,537,138 B2 | 3/2003 | Ohmori et al. | |
| 6,717,712 B2 | 4/2004 | Lynam et al. | |
| 6,932,483 B2 | 8/2005 | Strumolo et al. | |
| 6,979,090 B1 | 12/2005 | Wnuk | |
| 7,001,032 B2 | 2/2006 | Lo | |
| 7,025,469 B1 | 4/2006 | Manfre' et al. | |
| 7,080,913 B2 | 7/2006 | Henion et al. | |
| 7,097,312 B2 | 8/2006 | Platzer, Jr. | |

(Continued)

FOREIGN PATENT DOCUMENTS

DE 2915521 10/1980

(Continued)

*Primary Examiner* — Euncha Cherry
(74) *Attorney, Agent, or Firm* — Reising Ethington P.C.

(57) ABSTRACT

A mirror assembly for a motor vehicle includes a base that is fixedly secured to the motor vehicle. A housing is fixedly secured to the base. The housing defines an opening. A mirror is operatively secured to the housing at the opening. The mirror defines a main viewing portion and a spotting mirror portion wherein the main viewing portion and the spotting mirror portion are fabricated from a unitary structure. The mirror is a reflective element and defines a main viewing portion of one curvature and a spotting mirror portion for viewing the blind spot which is defined by having a radius of curvature less than the main viewing portion. Both viewing portions of the mirror are integral to one unitary structure that is fabricated from sheet metal such as steel, stainless steel, or aluminum that may optionally be chrome plated, polished, or anodized.

19 Claims, 4 Drawing Sheets

U.S. PATENT DOCUMENTS

| | | |
|---|---|---|
| 7,267,448 B2 | 9/2007 | Schmidt et al. |
| 7,420,756 B2 | 9/2008 | Lynam |
| 2003/0117731 A1 | 6/2003 | Platzer, Jr. |
| 2004/0114260 A1 | 6/2004 | Bartnick |
| 2004/0257685 A1 | 12/2004 | Minor et al. |
| 2006/0268440 A1 | 11/2006 | Platzer, Jr. |
| 2006/0279863 A1 | 12/2006 | Starbuck |

FOREIGN PATENT DOCUMENTS

| | | |
|---|---|---|
| DE | 3329998 | 3/1985 |
| EP | 0551802 | 7/1993 |
| GB | 2048189 | 12/1980 |
| JP | 55076721 | 6/1980 |
| KR | 2002092059 | 12/2002 |
| TW | 424057 | 3/2001 |

\* cited by examiner

SIDE MIRROR ASSEMBLY WITH INTEGRATED SPOTTING MIRROR

RELATED APPLICATIONS

This continuation in part patent application claims priority to a U.S. patent application filed on Sep. 14, 2007 and has application Ser. No. 11/855,588.

BACKGROUND ART

1. Field of the Invention

This invention relates to side mirror assemblies for motor vehicles. More particularly, the invention relates to side mirror assemblies having spotting mirrors to minimize the effects of blind spots in motor vehicles.

2. Description of the Related Art

In motor vehicles, side mirror assemblies typically enable the driver to conveniently view rearward and sideward portions of the vehicle to check for obstacles or other vehicles. Typically, the mirror assembly includes a base which attaches to the motor vehicle and supports a housing. Within the housing, a backing supports a reflective element. The reflective element typically adjusts so that various rearward and sideward portions around the motor vehicle may be viewed by the driver. The reflective elements or the mirrors are typically one uniform surface within the assemblies.

Some side mirror assemblies for motor vehicles are one uniform surface. U.S. Pat. No. 7,097,312 discloses a compound automotive rear view mirror. This composite mirror facilitates the reduction or elimination of blind zone due to the configuration of the composite mirror. More specifically, the composite mirror includes a glass main mirror and a convex auxiliary blind zone viewing mirror in one corner thereof. While these composite mirror configurations aid in the reduction or elimination of the blind zone or blind spot of a motor vehicle, these composite mirror configurations are difficult to maintain. Typically, the auxiliary mirror is glued to the primary mirror. The adhesive used to bond the two mirrors together may fail. Helping the failure of the adhesive, the use of devices such as scrapers to remove frost and debris from the mirror assembly weakens the adhesion between the two mirrors.

U.S. Pat. No. 7,420,756 also discloses a composite mirror within an automotive rear view mirror. This invention discloses a reflective element comprised of a substrate that is a molded, cast, or extruded, or cut from sheet and is a polymeric resin material. Optionally a film is disposed onto the substrate to provide an anti-abrasion layer. This film may be a glass or resin material and may also have a reflective coating applied to it. The reflective coating may be metallic. This patent does not, however, disclose a metallic substrate for the reflective surface. And while a portion of the mirror (18d) does not define a flat plane, this composite mirror does not have flanges extending around any portion of the periphery, nor does it disclose any channels in a backing plate to receive flanges formed on the back side of the composite mirror.

And finally, costs for such mirror assemblies are greatly increased. The production and inventory costs are increased due to the requirement of having two mirror elements for each side mirror assembly as in U.S. Pat. No. 7,097,312. In addition, labor costs associated with the production of the mirror assemblies and properly aligning the auxiliary mirror with respect to the primary mirror significantly increases the cost in manufacturing a side mirror assembly. The technical difficulties and complex equipment increase the costs and complexities of manufacture if one were to employ the inventions disclosed in U.S. Pat. No. 7,420,756 to adhere anti-abrasion films or layers of glass to a molded, cast, extruded or die cut sheet. Finally, it is technically difficult to uniformly heat composite mirrors if the mirror assembly has a heated glass feature.

SUMMARY OF THE INVENTION

A mirror assembly for a motor vehicle includes a base that is fixedly secured to the motor vehicle. A housing is fixedly secured to the base. The housing defines an opening. A mirror is operatively secured to the housing at the opening. The mirror defines a main viewing portion and a spotting mirror portion wherein the main viewing portion and the spotting mirror portion are fabricated from a unitary structure having a periphery and a flange extending around a portion of the periphery.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
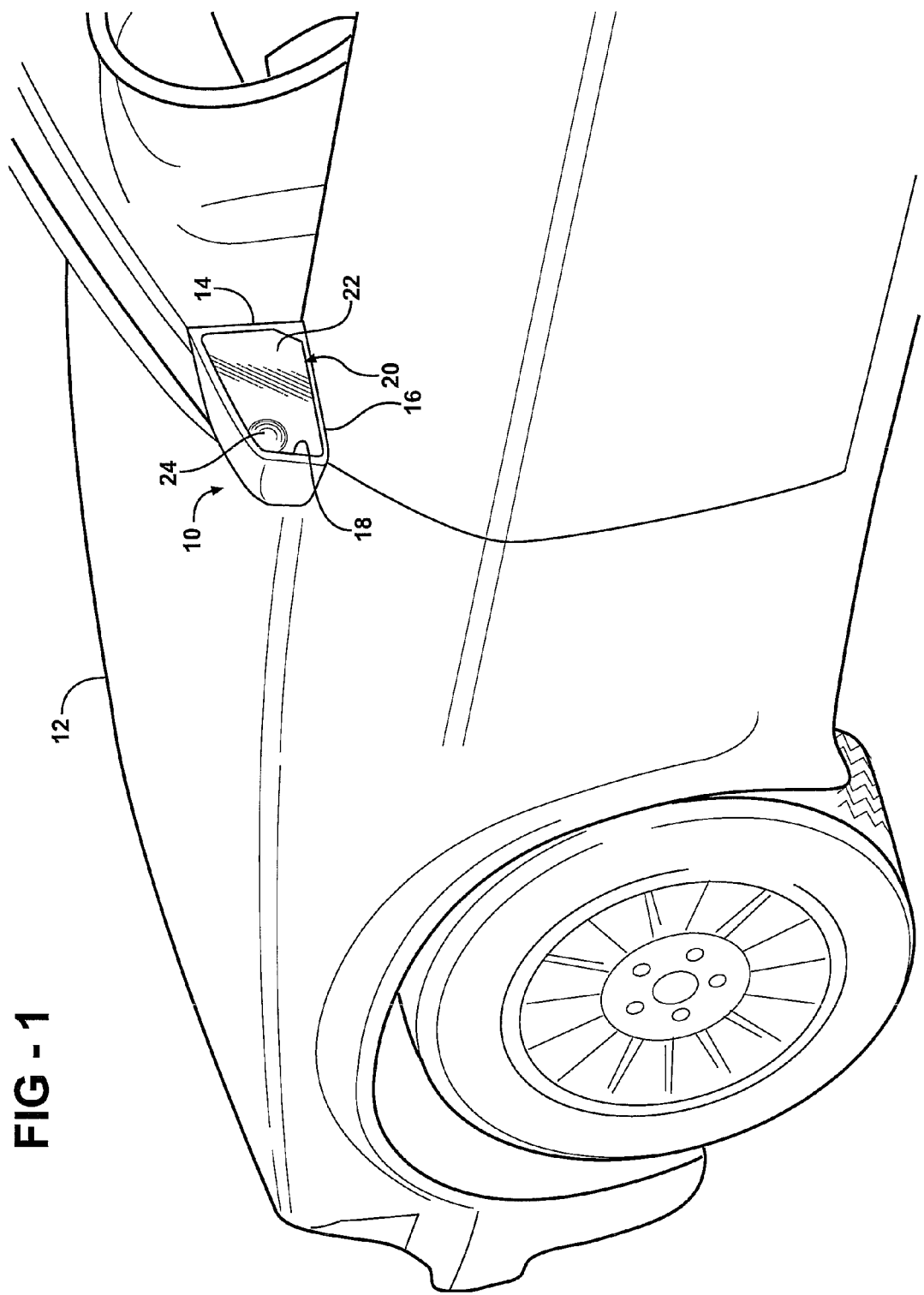
FIG. 1 is a perspective view of one embodiment of the invention fixedly secured to a motor vehicle, partially cut away.

Referring to FIG. 1, one embodiment of the invention, a side mirror assembly, is generally indicated at 10. The side mirror assembly 10 is fixedly secured to a motor vehicle 12. As may be seen in FIG. 3, there are two side mirror assemblies for each motor vehicle 12.

The side mirror assembly 10 includes a base 14 which is fixedly secured to the motor vehicle 12. A housing 16 is fixedly secured to the base 14. In the embodiment shown, the base 14 is used as a part of the housing 16. Other embodiments of side mirror assemblies 10 include bases which are not a part of the housing and are separate structures, sometimes separated by a tube allowing the housing to extend away from the base. It should be appreciated by those skilled in the art that these embodiments of side mirror assemblies may incorporate the invention discussed subsequently.

The housing 16 defines an opening 18 which faces rearward of the motor vehicle 12. A mirror, generally shown at 20, is operatively secured to the housing 16 at the opening 18 such that the mirror 20 is visible to an operator inside the motor vehicle 12 allowing the operator to view rearward of the motor vehicle without having to turn around. The mirror 20 defines a main viewing portion 22 and a spotting mirror portion 24 wherein the main viewing portion 22 and the spotting mirror portion 24 are fabricated from a unitary structure. The unitary structure has the advantage that inventory and assembly costs are lowered. In addition, the unitary structure of the mirror 20 allows heat applied by a heating element (not shown) to be distributed evenly across the entire surface of the mirror 20, including the spotting mirror portion 24.

The spotting mirror portion 24 defines a first radius of curvature. The main viewing portion 22 defines a second radius of curvature. The first radius of curvature is less than the second radius of curvature. In many instances, the rear view portion 22 will be flat. In this situation, the radius of curvature for a flat surface is infinite in length. Therefore, the first radius of curvature is always going to be greater than the second radius of curvature of the spotting mirror in situations where the main viewing portion 22 is flat. The spotting mirror portion 24 is a convex surface providing for an enlarged view rearward of the motor vehicle 12.

Figure 2:
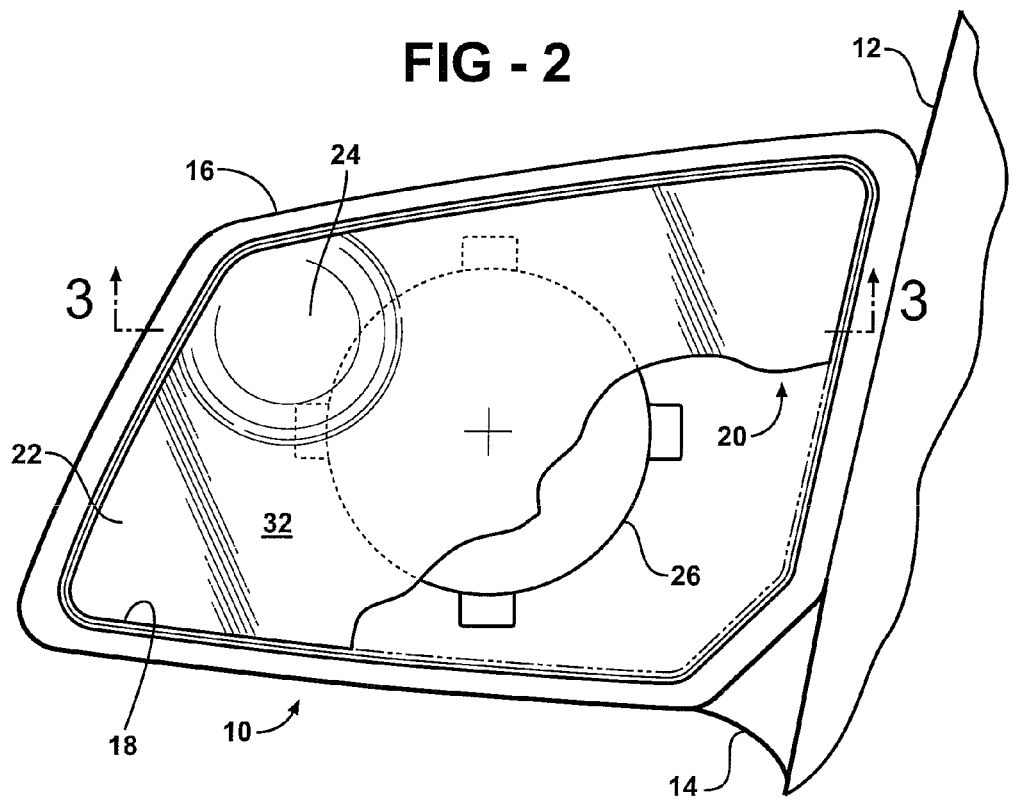
FIG. 2 is a side view of the invention with the main viewing portion thereof partially cutaway.

Referring to FIG. 2, the mirror 20 is secured to the housing 16 using a pivotable mount 26. This mount allows the mirror 20 to be directed in a direction that allows the operator of the motor vehicle 12 to view rearward of the motor vehicle 12 as much as possible in a direction that is useful for the operator. The pivotal mount 26 may be pivoted manually or through an electronic motor system.

Figure 3:
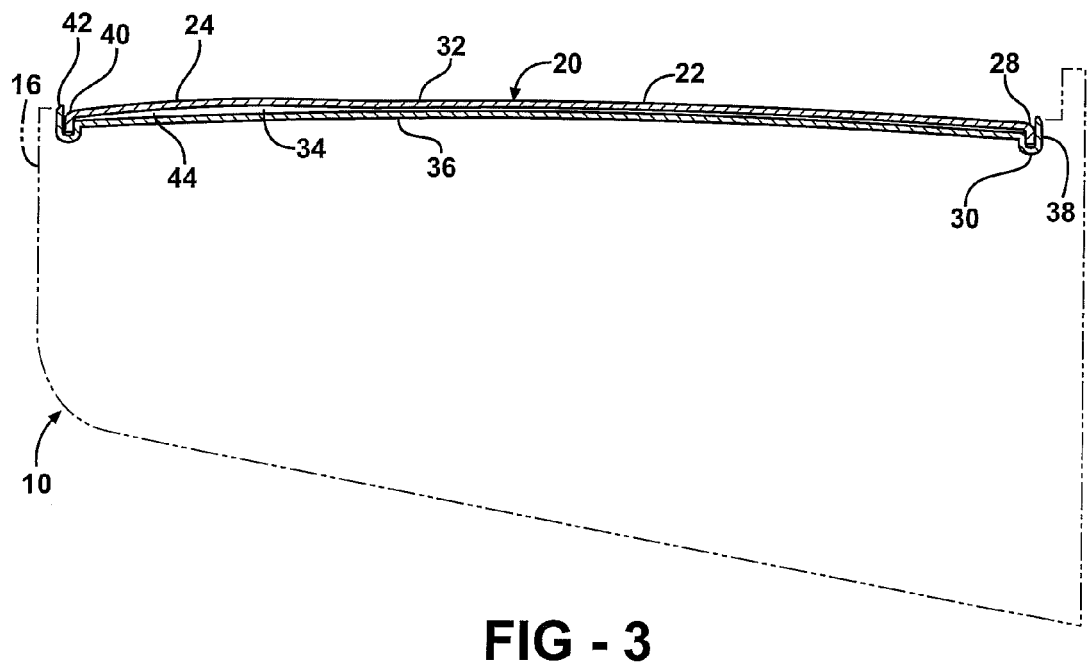
FIG. 3 is a cross-sectional view of the invention taken along lines 3-3 of FIG. 2.

Referring to FIG. 3, the housing 16 is shown in phantom. A profile of the mirror 20 is shown. The mirror 20 is a unitary structure fabricated from a sheet of metal. This metal may be steel, stainless steel, or aluminum that may optionally be chrome plated, polished, or anodized. This metal is formed by a stamping process which will be discussed in greater detail subsequently.

The mirror 20 defines a periphery 28. A flange 30 extends along or around the sheet metal at the periphery 28. The flange 30 is substantially perpendicular to the main viewing portion 22 of the mirror 20. The flange 30 strengthens the mirror 20 and thus, facilitates the maintenance of its "flatness." The mirror 20 defines a reflective surface 32 which is visible to the operator of the motor vehicle because it faces outwardly from the opening 18 of the housing 16. The mirror 20 also includes a back surface 34 which faces inwardly into the housing 16. A backing plate 36 is disposed adjacent the back surface 34 of the mirror 20. The backing plate 36 provides structural support for the mirror 20. The backing plate 36 defines a backing periphery 38 and a backing channel 40. The backing channel 40 extends along the backing periphery 38. An exterior edge 42 extends along the backing periphery 38. The backing channel 40 defines a width equal to or less than the depth or thickness of the mirror 20. The backing channel 40 receives the flange 30 of the mirror 20 therein and secures the mirror 20 thereto. A layer or sheet of adhesive (not shown) is disposed therebetween to secure the mirror 20 to the backing plate 36. The backing plate 36 is secured to the pivotal mount 26 such that there is lost motion between the pivotal mount 26 and the backing plate 36. An air gap 44 exists between the mirror 20 and the backing plate 36 at the location where the spotting mirror portion 24 exists. This is because the radius of curvature for the spotting mirror portion 24 is smaller than the radius of curvature for the main viewing portion. It should be appreciated by those skilled in the art that the backing plate 36 may have a profile similar to the mirror 20, thus eliminating the air gap 44.

Figure 4:
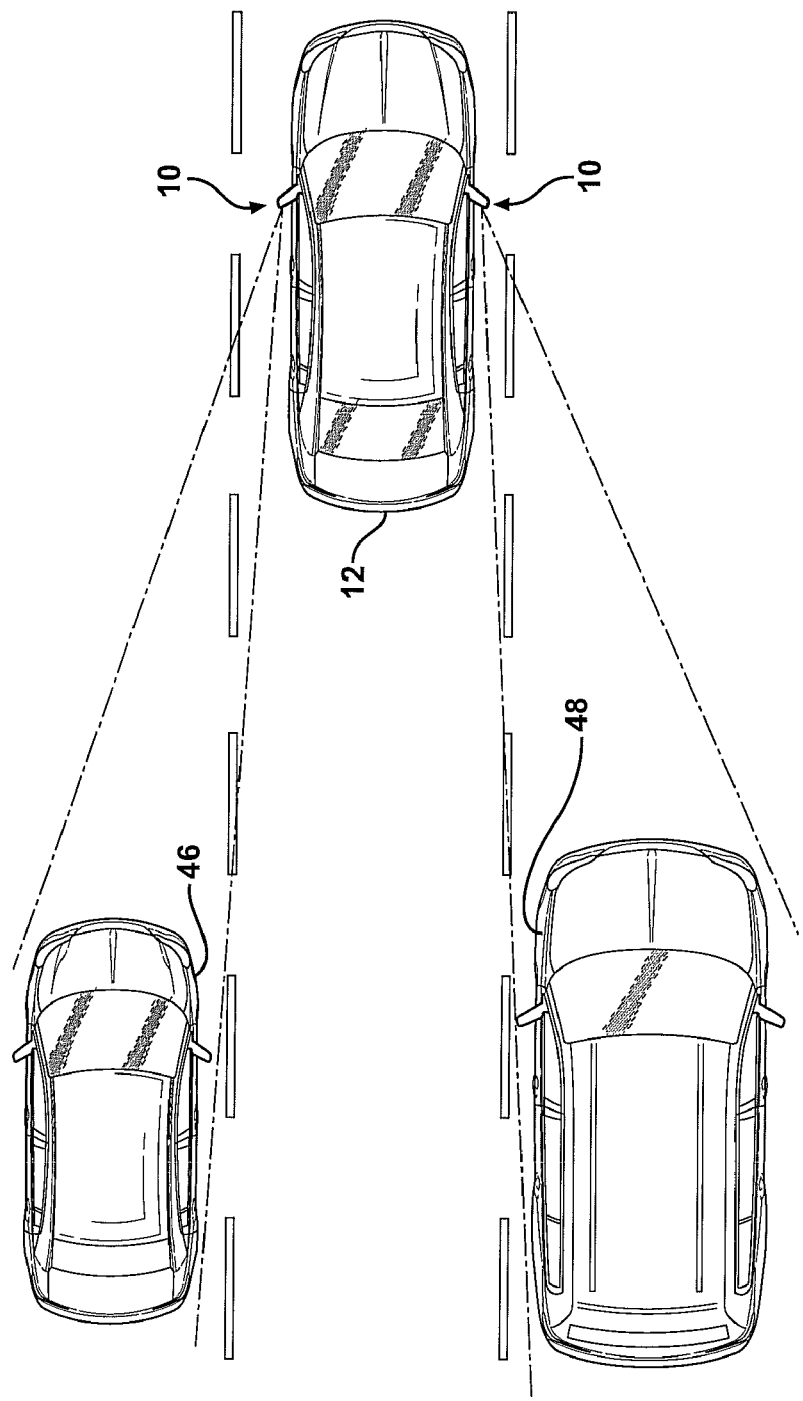
FIG. 4 is a top view of a motor vehicle using the invention on a roadway with two motor vehicles illustrated in the blind spot of the motor vehicle that has incorporated the invention.

In operation, the operator of the motor vehicle will use the spotting mirror portion 24 to view vehicles 46, 48 that are in locations difficult to see by the operator using the side mirror assemblies 10 that are mounted to each side of the motor vehicle 12. This is graphically represented in FIG. 4. By use of the spotting mirror 24, the operator has a larger view extending rearward of the motor vehicle providing for safer operation thereof.

Figure 5:
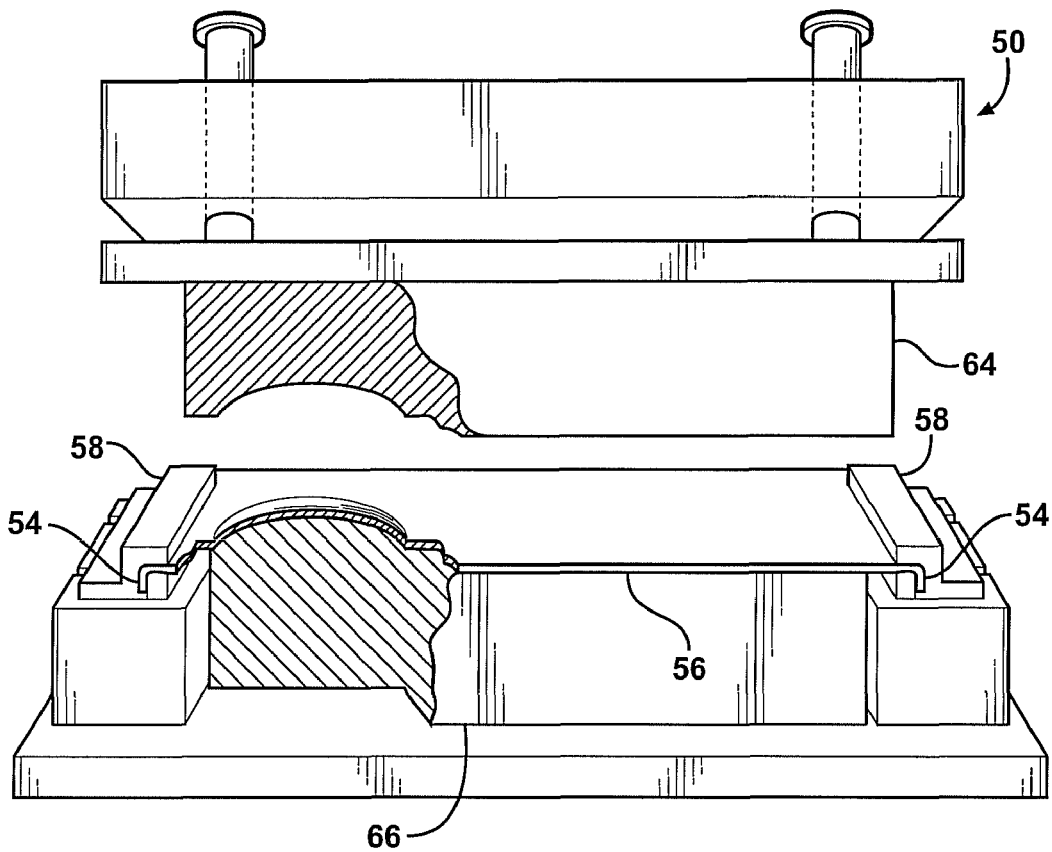
FIG. 5 is a cross-sectional side view of an assembly used to fabricate the mirror.
Figure 6:
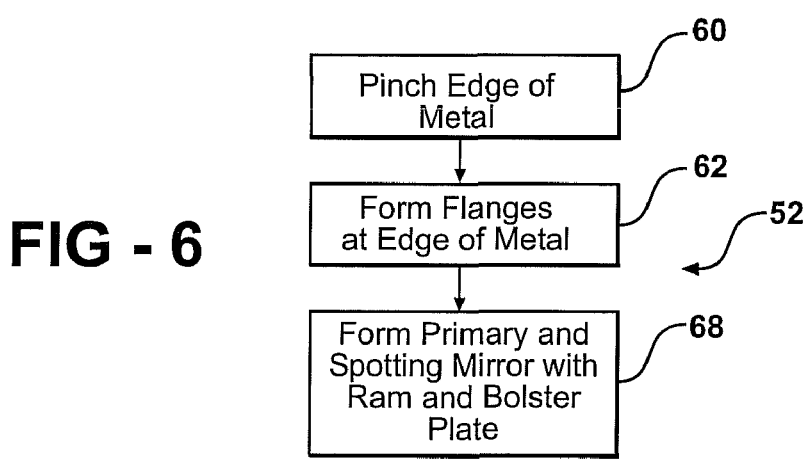
FIG. 6 is a logic chart of one method for fabricating the mirror.

Referring to FIGS. 5 and 6, the method of manufacturing the mirror 20 is depicted. The mechanism for stamping the mirror 20 is generally shown at 50 in FIG. 5. The stamping mechanism 50 stretch bends the material used to fabricate the mirror 20. The method for stamping is generally shown at 52 in FIG. 6. The method begins by pinching edges 54 of the metal 56 by dropping a movable gripper 58 onto the edges 54 of the metal 56 to pinch the edges of the metal at 60 (FIG. 6). Depending on the design, there may be more than one movable gripper 58. The movable gripper 58 creates the flange 30 at the edge 54 of the metal 56 at 62.

Once the metal 58 is secured in a position over a lower bolster plate or die block 64, the main viewing portion 22 and the spotting mirror portion 24 are formed by having a ram or upper die block 66 bend and form the metal 56. This occurs at step 68 in FIG. 6. This method 52 provides an excellent substrate upon which a reflective coating may be applied. The metal 56 is smooth and, because in part of the flange(s) 30 formed at the edge 54 of the metal 56, the resulting mirror 20 is stronger and less likely to be distorted during assembly and/or use.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A mirror assembly for a motor vehicle, said mirror assembly comprising:
   a base fixedly secured to the motor vehicle;
   a housing fixedly secured to said base, said housing defining an opening; and
   a mirror operatively secured to said housing at said opening, said mirror defining a main viewing portion and a spotting mirror portion wherein said main viewing portion and said spotting mirror portion are fabricated from a unitary structure, said mirror defining a periphery and having a flange extending around a portion of said mirror at said periphery.

2. A mirror assembly as set forth in claim 1 wherein said spotting mirror portion defines a first radius of curvature.

3. A mirror assembly as set forth in claim 2 wherein said main viewing portion defines a second radius of curvature such that said first radius of curvature is less than said second radius of curvature.

4. A mirror assembly as set forth in claim 3 wherein said unitary structure is a sheet of metal.

5. A mirror assembly as set forth in claim 4 wherein said sheet of metal includes a reflective surface and a back surface.

6. A mirror assembly as set forth in claim 5 including a backing plate fixedly secured to said mirror and disposed adjacent said back surface thereof to provide structural support for said mirror.

7. A mirror assembly as set forth in claim 6 wherein said backing plate defines a backing periphery and a backing channel extending along a portion thereof.

8. A mirror assembly as set forth in claim 7 wherein said backing plate includes an exterior edge extending out from said backing plate.

9. A mirror assembly as set forth in claim 8 wherein said backing channel defines a width to receive said flange therein.

10. A mirror assembly as set forth in claim 9 wherein said reflective surface is chrome plated.

11. A mirror assembly as set forth in claim 10 wherein said mirror is anodized with aluminum.

12. A mirror assembly for a motor vehicle, said mirror assembly comprising:
a base fixedly secured to the motor vehicle;
a housing fixedly secured to said base, said housing defining an opening; and
a mirror operatively secured to said housing at said opening, said mirror defining a main viewing portion and a spotting mirror portion wherein said main viewing portion and said spotting mirror portion are fabricated from a unitary structure, said mirror defining a periphery and having a flange extending around all of said mirror at said periphery.

13. A mirror assembly as set forth in claim 12 wherein said spotting mirror portion defines a first radius of curvature.

14. A mirror assembly as set forth in claim 13 wherein said main viewing portion defines a second radius of curvature such that said first radius of curvature is less than said second radius of curvature.

15. A mirror assembly as set forth in claim 14 wherein said unitary structure is a sheet of metal.

16. A method of fabricating a mirror surface from a metal blank, the method comprising the steps of:
cutting the metal blank to define a periphery;
applying a force to the periphery of the metal blank to form a flange around the periphery of the metal blank; and
stretch bending the metal blank to form a mirror having a primary mirror section and a spotting mirror section.

17. A method as set forth in claim 16 wherein the step of stretch bending includes the step of stamping the metal blank with a ram.

18. A method as set forth in claim 17 including the step of chrome plating the primary mirror section and the spotting mirror section.

19. A method as set forth in claim 17 including the step of inserting the flange of the mirror into a backing plate of a side mirror assembly.

* * * * *